UNITED STATES PATENT OFFICE.

HEINRICH REIBESTEIN, OF NEW YORK, N. Y.

IMPROVEMENT IN COMPOUNDS FOR BEVERAGES.

Specification forming part of Letters Patent No. 177,003, dated May 2, 1876; application filed February 14, 1876.

*To all whom it may concern:*

Be it known that I, HEINRICH REIBESTEIN, of the city, county, and State of New York, have invented a new and useful Compound for Making Beverages; and I do hereby declare that the following is a full, clear, and exact description of the component parts of and method of compounding the same.

My compound, as put up for sale and kept ready for use, is composed of the ingredients hereinafter specified, in the proportions, by weight, as follows: Caramel, six (6) ounces or thirty four thousand five hundred and sixty parts; sugar, one (1) ounce or five thousand seven hundred and sixty parts; Glauber's salt, one (1) ounce or five thousand seven hundred and sixty parts; tartaric acid, three (3) drams or one hundred and eighty parts; chloride of sodium, two (2) drams or one hundred and twenty parts; tincture of red pepper, one (1) scruple or twenty parts; extract of quassia, one (1) grain or one part; water, five (5) ounces or twenty-eight thousand eight hundred parts.

These are made into a solution which may be sold in bottles, and, when required for use, may be diluted with any quantity of water to suit the taste, and used as a beverage in the same way as coffee.

The flavor of this beverage closely resembles that of a decoction of roasted coffee, and to persons of certain constitution will be more healthful than coffee.

I have herein given such proportions of the several ingredients of which my beverage is composed as I consider best adapted to produce the flavor most nearly resembling that of coffee; but I do not limit myself to the exact proportions specified, as these may be to some extent varied without materially changing the character of my invention.

I claim—

A compound for making beverages consisting of caramel, sugar, Glauber's salt, tartaric acid, chloride of sodium, tincture of red pepper, extract of quassia, and water, substantially as described.

HENR. REIBESTEIN.

Witnesses:
MICHAEL RYAN,
FRED HAYNES.